(12) United States Patent
Haeussermann et al.

(10) Patent No.: US 12,485,736 B2
(45) Date of Patent: Dec. 2, 2025

(54) ARRANGEMENT FOR OPERATING AN ELECTRIC MOTOR IN A VEHICLE

(71) Applicant: Webasto SE, Stockdorf (DE)

(72) Inventors: Rudolf Haeussermann, Stockdorf (DE); Peter Wittich, Stockdorf (DE); Franz Fersch, Stockdorf (DE); Imre Fekete, Stockdorf (DE); Jens Kreher, Stockdorf (DE)

(73) Assignee: Webasto SE, Stockdorf (DE)

( * ) Notice: Subject to any disclaimer, the term of this patent is extended or adjusted under 35 U.S.C. 154(b) by 400 days.

(21) Appl. No.: 18/107,846

(22) Filed: Feb. 9, 2023

(65) Prior Publication Data

US 2023/0249527 A1 Aug. 10, 2023

(30) Foreign Application Priority Data

Feb. 10, 2022 (DE) .......................... 102022103093.8

(51) Int. Cl.
| | |
|---|---|
| *H02P 6/00* | (2016.01) |
| *B60J 1/20* | (2006.01) |
| *B60J 7/00* | (2006.01) |
| *B60J 7/057* | (2006.01) |

(52) U.S. Cl.
CPC .......... *B60J 7/0573* (2013.01); *B60J 1/2016* (2013.01); *B60J 7/0015* (2013.01)

(58) Field of Classification Search
CPC ...... B60J 7/0573; B60J 7/0015; B60J 1/2016; H02P 6/00; H02P 7/05; H02P 7/29
USPC .......................................................... 318/55
See application file for complete search history.

(56) References Cited

U.S. PATENT DOCUMENTS

| | | | |
|---|---|---|---|
| 7,511,393 B2 | 3/2009 | Mizutani | |
| 2007/0035935 A1* | 2/2007 | Gottmann | ............ H02K 11/028 |
| | | | 361/800 |
| 2007/0290180 A1* | 12/2007 | Kazerooni | ............... B66D 3/18 |
| | | | 254/275 |

(Continued)

FOREIGN PATENT DOCUMENTS

| | | | |
|---|---|---|---|
| DE | 102006050067 A1 | 5/2008 | |
| DE | 102008003246 A1 * | 7/2008 | ............. H01H 9/061 |
| DE | 202009001995 U1 | 6/2009 | |

(Continued)

*Primary Examiner* — Gabriel Agared
(74) *Attorney, Agent, or Firm* — Command IP LLP; Michael Zarrabian

(57) ABSTRACT

The invention relates to an arrangement for operating an electric motor, for example an electric motor for actuating a roof component, in a vehicle. Therein, the electric motor is electrically connected via at least two control lines with a motor control unit. The motor control unit is configured to control the electric motor by means of pulse width modulation. The motor control unit is configured to operate a first one of the two drive lines as an inactive line, and to operate a second one of the two drive lines as an active line during control of the electric motor. A switching module associated with the electric motor is configured to connect a terminal of the pole housing of the electric motor with the drive line which is operated as the inactive line during operation of the electric motor. The invention further relates to an electric motor as well as to a method of operating an electric motor, for example an electric motor for actuating a roof component, in a vehicle.

17 Claims, 2 Drawing Sheets

(56) References Cited

U.S. PATENT DOCUMENTS

2009/0025170 A1* 1/2009 Price .................. B60S 1/08
   388/815
2018/0202698 A1* 7/2018 Chretien ............ G05B 19/042

FOREIGN PATENT DOCUMENTS

| | | |
|---|---|---|
| DE | 202010010285 U1 | 10/2010 |
| DE | 102013210061 A1 | 12/2013 |
| DE | 102016224262 A1 | 6/2018 |
| DE | 102017111396 A1 | 11/2018 |
| DE | 102019102536 A1 | 8/2020 |
| EP | 0826267 B1 | 3/1998 |
| EP | 0666957 B1 | 6/1999 |
| EP | 1249928 A1 | 10/2002 |
| JP | 2004040931 A | 2/2004 |
| JP | 2006311751 A | 11/2006 |
| WO | WO-2008049759 A1 * | 5/2008 ............ H02K 11/40 |

* cited by examiner

ARRANGEMENT FOR OPERATING AN ELECTRIC MOTOR IN A VEHICLE

CROSS-REFERENCE TO RELATED APPLICATION

This application claims priority to German Application No. DE 10 2022 103 093.8 filed Feb. 10, 2022, which is incorporated herein by reference in its entirety for all purposes.

TECHNICAL FIELD

The invention relates to an arrangement for operating an electric motor, for example an electric motor for actuating of a roof component, in a vehicle.

BACKGROUND

DC electric motors, such as those used for sunroofs, window regulators and other devices in vehicles, are often operated with a pulse width modulation (PWM) signal for rotation speed control. If there is a spatial distance between the control unit and the motor to be controlled, the PWM signal has to be routed via a wiring harness, depending on the application, over a longer distance and through areas that are susceptible to electromagnetic interference.

To control the motor in this setup, exactly two motor lines are regularly used, supplemented by lines for sensor signals if necessary. A separate ground line is not provided.

Typical motors, insofar as they are configured as brush motors, are further equipped with a circuit for suppressing brush fire. Among other things, such circuit contains each one capacitor per connection with regard to the pole housing, which is thus arranged in the middle of the two motor lines via a capacitive voltage divider. The pole housing therefore always is at half the voltage level of the PWM signal.

Because of its large surface area, the pole housing may couple this signal into the vehicle antenna, causing interference to radio reception, especially in the medium-wave range.

To reduce such interference, the capacitances used to suppress the brush fire in the motor have hitherto been reduced, for example. However, this reduction of the capacitances in the motor leads to problems with the damping of the brush fire. Apart from this, this approach is not sufficient as the sole measure, as interference must still be accepted in this way.

Furthermore, an additional ground line may be used to ground the pole housing and avoid the generation of the decoupled radiation. However, a ground line causes additional costs and requires an extension of the connector pins for corresponding connections. Furthermore, the return current may cause further interference.

Since only one line is active at a time during PWM operation, an attempt has also been made to couple-in a counter signal by connecting the pole housing to one of the two lines for operating the motor and to suppress the interference in this way. However, this may only solve the problem when the motor is operated in just one direction of rotation—the effect is amplified in the other direction of rotation.

However, electromagnetic interference may also occur with brushless motors.

Document DE 10 2017 111 396 B4 describes an arrangement for active suppression of interference signals. Therein, an EMC filter is used and its arrangement is described.

SUMMARY

It is the task of the invention to provide an arrangement of the type as described at the top above, which enables particularly efficient interference suppression that can be implemented at low cost.

This task is solved by an arrangement of the type as mentioned at the top above and comprising the features of claim 1. Advantageous embodiments and further developments of the invention are indicated in the dependent claims.

In the arrangement for operating an electric motor, for example an electric motor for actuating of a roof component, in a vehicle, the electric motor is electrically connected with a motor control unit via at least two drive lines. Thereby, the motor control unit is configured to control the electric motor via pulse width modulation. When controlling the electric motor, the motor control unit is configured to operate a first one of the two drive lines as an inactive line and to operate a second one of the two drive lines as an active line. A switching module associated with the electric motor is configured to connect a terminal of the pole housing of the electric motor with that drive line which is operated as the inactive line during operation of the electric motor.

By means of this, suppression of the brush fire can be achieved without generating electromagnetic interference thereby.

A fundamental idea of the invention is based on the fact that the inactive line is used in order to achieve grounding of the pole housing. Such line can be used, as the proper control of the motor is effected via the active line. It means that an efficient decoupling of the resulting system may be achieved without having to supplement many further elements in this regard. Thus, the invention can be integrated in a cost-efficient manner and without changes with regard to further elements.

Some of the advantages of the invention consequently refer to the independency from the used control device, to the possibility of operation based on just a two-wired cable, i. e., without the need for additionally provided voltages or signals, as well as to the possibility of integration into existing or available motors, without changes to the respective motor itself.

In an embodiment of the device the electric motor is configured to actuate a roof component of the vehicle. Such a roof component may for example be configured to move a roof-light or a roof-blind. Other fields of application and corresponding electric motors may also be provided in the vehicle, for example for actuating or adjusting another component, such as a window, a tailgate/hatch, a door or the like.

In a further embodiment, the electric motor may be embodied as a DC motor. Such a motor may be driven directly via pulse width modulation.

The DC motor may for example be a brushless DC motor (BLDC motor).

In particular, the electric motor may be an internal rotor motor. Further, the use of an external rotor motor is conceivable.

The DC motor may further be a brush motor.

In an embodiment, the electric motor is provided with a circuit for suppressing a brush fire, which may comprise for example a capacitive voltage divider. Advantageously, by this, an operation of the electric motor is achieved, which is even further free of interference. The circuit for suppressing a brush fire may for example comprise a capacitive voltage divider, wherein there is provided for example each one capacitor per terminal with respect to the pole housing. As a result, the pole housing is thus arranged in the middle of the two drive lines over the capacitive voltage divider and is always operated at half the voltage level of the PWM signal which is provided via the active line.

In an embodiment, the switching module is integrated into a motor circuit board and/or in a housing of the electric motor. As a consequence, an advantage is achieved that the decoupling of the electric motor can be addressed directly upon manufacturing of the motor. I.e., the manufacturer of the motor or its supplier may provide an electric module having advantageous properties regarding decoupling, without a need to apply changes in the motor control unit in this regard. The control unit may thus be used independently from a question which kind of decoupling of the electric motor is desired. In particular, the electric motor according to the invention may be implemented very flexibly and is compatible with the plurality of motor control units.

In particular, the switching module may comprise a semiconductor switch. This facilitates the fast and efficient switching depending on the direction, with which the electric motor is operated, and depending on the thus actively operated drive line.

In an embodiment, the switching module comprises a field effect transistor (FET), and more particularly a metal-oxide field effect transistor (MOSFET). Herein, a first and a second switching module is particularly provided for the first and second drive line of the arrangement, respectively.

These components allow a particularly compact and efficiently operating structure using a semiconductor switch.

In a further embodiment, the switching module comprises a diode, in particular a rectifier provided with a diode and a resistor. By this, an advantage is achieved, that a semiconductor switch or a similar component can be easily controlled, in order to obtain a desired switching and connection of the pole housing with the inactive line.

Alternatively or additionally, another component may be provided as a switch, in particular for performing an active switching based on a control signal. Therein, a detection circuit may be further provided, which may be integrated into the motor circuit board and which determines, which of the drive lines is operated as the inactive line, and which then also causes the respective switching.

In an embodiment, the switching module comprises a bipolar transistor or a relay.

The electric motor for a vehicle, for example for operating a roof component of the vehicle, comprises at least two terminals for connecting a first and a second drive line. Thereby, the electric motor can be controlled via the terminals by means of pulse width modulation. When controlling the electric motor, the first one of the two drive lines can be operated as an inactive line, and a second one of the two drive lines can be operated as an active line. Thereby, switching module is associated with the electric motor, which is configured to connect a terminal of the pole housing of the electric motor with the drive line operated as the inactive line during operation of the electric motor.

The switching module can be integrated into a motor circuit board, which in turn may be a constituent part of the electric motor.

In the method for operating an electric motor, for example an electric motor for actuating a roof component, in a vehicle, the electric motor is controlled by means of pulse width modulation via at least two drive lines. Therein, when controlling the electric motor, a first one of the two drive lines is operated as an inactive line and a second one of the two drive lines is operated as an active line. A switching module connects a terminal of the pole housing of the electric motor with the drive line which is operated as the inactive line during operation of the electric motor.

The method is particularly configured to operate the arrangement and the electric motor. It therefore includes the same advantages as the arrangement according to the invention and the electric motor.

BRIEF DESCRIPTION OF THE DRAWINGS

In the following, the invention will be explained in more detail below with reference to the accompanying drawings. Therein.

DETAILED DESCRIPTION

Figure 1:
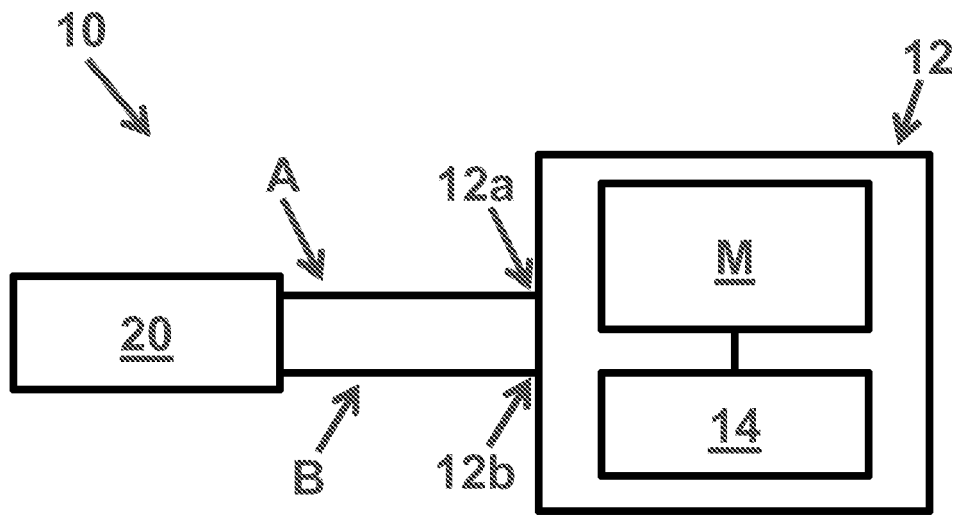
FIG. 1 shows an embodiment of the arrangement.
Figure 2:
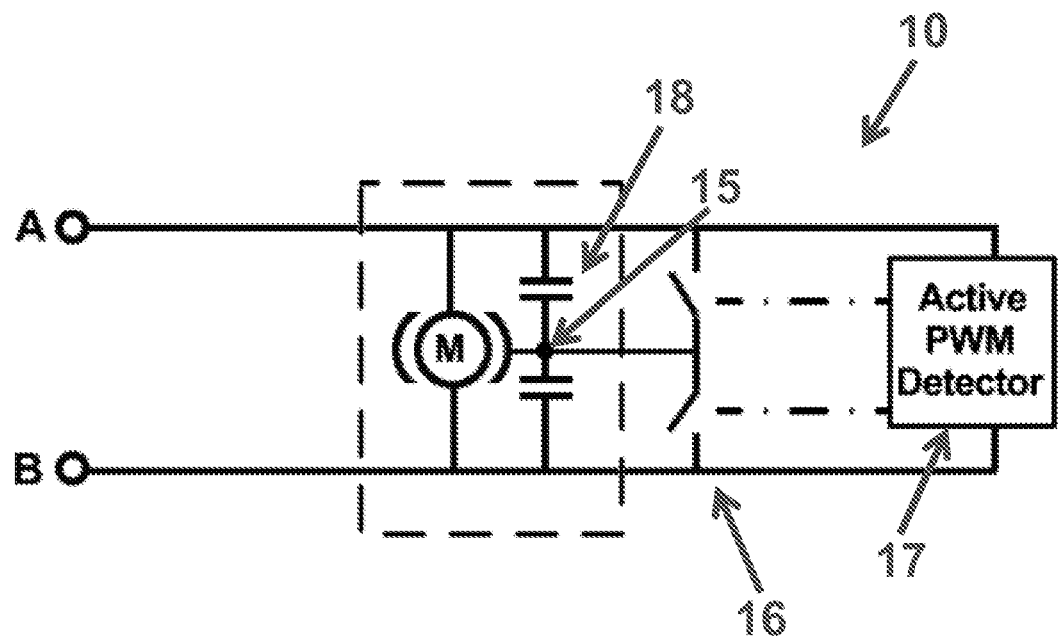
FIG. 2 shows a detail view of the embodiment of the arrangement.
Figure 3:
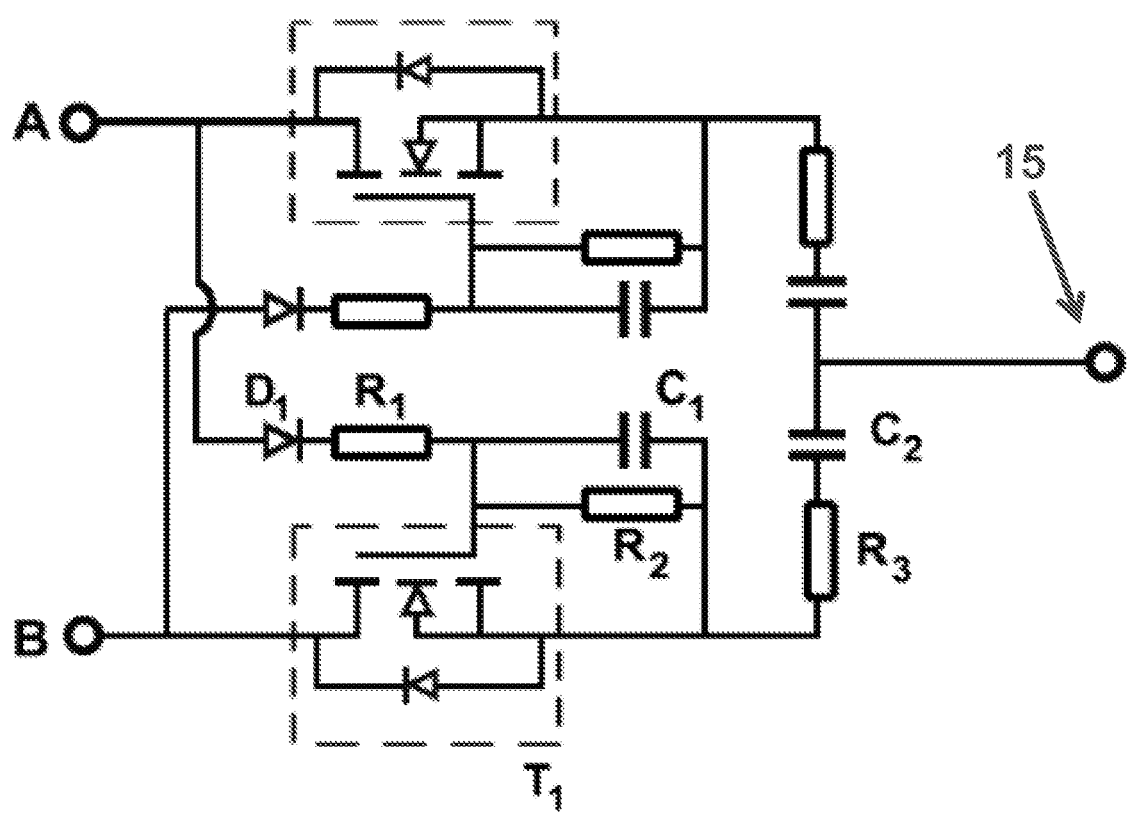
FIG. 3 shows a further detail view of the embodiment of the arrangement.

With reference to FIGS. 1 to 3 an embodiment of the arrangement is detailed.

In the embodiment, the arrangement 10 comprises a control unit 20. In further embodiments, the control unit does not need to be comprised by the arrangement 10, but may also rather be connected thereto as an external unit.

A motor circuit board 12 is further provided.

An electric motor M and a switching module 14 connected thereto are coupled to the motor circuit board 12.

In this embodiment the electric motor M is configured as a brush motor.

According to further embodiments, the electric motor may be configured as the BLDC motor.

The motor board 12 further comprises terminals 12a, 12b, which are configured as supply terminals. It means that electric voltage is supplied via terminals 12a, 12b for operating the electric motor M. Furthermore, auxiliary signals may be provided, which are, however, not relevant in the following description.

In the embodiment, the motor circuit board, the electric motor M and the switching module 14 are arranged within a same housing, or are otherwise arranged integrated with each other. The terminals 12a, 12b are in this case accessible from the exterior, or can be connected with external units.

The terminals 12a, 12b are each connected with one of two drive lines A, B.

The control unit 20 generates signals for operating the electric motor M via pulse width modulation (PWM). Thereby, the signals are transmitted over a drive line A as an "active line" while the other drive line B is operated in this case as an "inactive line".

The choice of the active and inactive line, respectively, is determined depending on the direction of rotation in which the electric motor M is operated. The respectively other drive line B operated as an inactive line is connected to ground, i.e., it is grounded.

In the embodiment, the electric motor M comprises a circuit for suppressing the brush fire during operation. This circuit comprises, according to the embodiment, a capacitive voltage divider 18 having each one capacitor per terminal. This voltage divider is connected with a pole housing of the electric motor via a pole housing terminal 15. The pole housing is thus arranged between the two drive lines and is continuously held at half the voltage level of the PWM signal.

In an embodiment, in which the electric motor is configured as a BLDC motor, further circuits may be implemented, which may lead to electromagnetic interference or which damp such interference.

In the arrangement 10 of the embodiment, the switching module 14 is provided in order to connect the pole housing automatically with that drive line A, B, which is operated as an inactive line.

Expressed more generally, an active PWM detector is provided in this regard, namely detection circuit 17. The detection circuit 17 is connected with the drive lines A, B and serves to detect, which drive line A, B is currently operated as the inactive line. In dependence from the result of the detection, a switching device, such as a semiconductor switch 16, is controlled in order to connect the pole housing terminal 15 with the inactive line.

Such a circuit is shown in a specific embodiment in FIG. 3. Since the circuit is arranged symmetrically, just one half of it is provided with reference numerals. The other half is arranged likewise and is also shown in FIG. 3.

In the embodiment, a diode $D_1$ and a capacitor $C_1$ jointly form a rectifier. The rectifier is coupled with the first drive line A. A resistor $R_1$ arranged between the diode $D_1$ and the capacitor $C_1$ thereby serves to limit a current. Moreover, there is provided a further resistor $R_2$ via which the capacitor $C_1$ may be discharged.

Between the resistor $R_1$ and the capacitor $C_1$ there is provided a connection with the gate-input of a semiconductor switch $T_1$ arranged in the second drive line B.

In a first case, in which the first drive line A is operated as the active line during PWM control of the electric motor M, the gate of the semiconductor switch $T_1$ is at the voltage level provided via drive line A. In a common PWM control, this corresponds to about 12 V. According to further embodiments, other voltage levels may be provided.

A transistor of the semiconductor switch $T_1$ is thus switched into the conductive state and the pole housing terminal 15 is consequently connected with the drive line B via a further capacitor $C_2$ and a further resistor $R_3$, wherein the drive line B is operated in this case as the inactive line.

At the same time the connection between the pole housing terminal 15 and the drive line A is disconnected in this case, since in the symmetrically arranged branch, the gate of the transistor provided therein is not supplied with a gate voltage in this case.

The further capacitor $C_2$ in the connection between the drive line B and the pole housing terminal 15 serves to avoid possibly occurring short currents. The upstream resistor $R_3$ serves to damp optionally occurring oscillations, which may be generated between the interference suppression capacitors and the supply line.

LIST OF REFERENCE NUMERALS

10 arrangement
12 motor circuit board
12a, 12b terminal
14 switching module
15 pole housing terminal
16 semiconductor switch
17 detection circuit
18 capacitive voltage divider
20 control unit
A drive line
B drive line
$C_1, C_2$ capacitor
$D_1$ diode
M electric motor
$R_1, R_2, R_3$ resistor
$T_1$ semiconductor switch, MOSFET

The invention claimed is:

1. An Arrangement for operating an electric motor, for actuating a roof component, in a vehicle
   wherein the electric motor is electrically connected with a motor control unit via at least two drive lines;
   wherein the motor control unit is configured to control the electric motor by means of pulse width modulation;
   wherein when the electric motor is controlled, the motor control unit is configured to operate a first drive line of the two drive lines as an inactive line and to operate a second drive line of the two drive lines as an active line depending on the direction of rotation in which the electric motor is to be operated; and
   wherein a switching module associated with the electric motor is configured to connect a terminal of a pole housing of the electric motor in each case of direction in which the electric motor is to be operated with the drive line which is operated as the inactive line.

2. The Arrangement according to claim 1, wherein the switching module is configured to switch a connection of a terminal of a pole housing of the electric motor between the drive lines, depending on the direction of rotation in which the electric motor is to be operated.

3. The Arrangement according to claim 1, wherein the switching module is configured to detect, which drive line is currently operated as the inactive line, and in dependence from the result of the detection, controls a switching device, in order to connect the pole housing terminal with the inactive line.

4. The Arrangement according to claim 1,
   wherein the electric motor is configured for actuating a roof component of the vehicle.

5. The Arrangement according to claim 4, wherein the electric motor is configured for moving at least one of: a roof-light and a roof-blind.

6. The Arrangement according to claim 4,
   wherein the electric motor is configured as a DC motor.

7. The Arrangement according to claim 6, wherein the electric motor is configured as a brushless DC motor.

8. The Arrangement according to claim 6,
   wherein the electric motor is provided with a circuit for suppressing a brush fire.

9. The Arrangement according to claim 8, wherein the circuit comprises a capacitive voltage divider.

10. The Arrangement according to claim 8,
    wherein the switching module is integrated in at least one of: a motor circuit board and in a housing of the electric motor.

11. The Arrangement according to claim 10,
    wherein the switching module comprises a field effect transistor.

12. The Arrangement according to claim 11, wherein the switching module comprises a metal-oxide field effect transistor, and wherein a first and a second switching module are provided for the first and second drive lines, respectively.

13. The Arrangement according to claim 11,
    wherein the switching module comprises a diode.

14. The Arrangement according to claim 13, wherein the switching module comprises at least one of: a bipolar transistor and a relay.

15. The Arrangement according to claim 13, wherein the switching module comprises a rectifier formed from the diode and a resistor.

16. An Electric Motor for a vehicle for actuating a roof component, comprising:
- at least two terminals for connecting a first and a second drive line;
- wherein the electric motor is configured to be controlled via the terminals by means of pulse width modulation;
- wherein when the electric motor is controlled, a first drive line of the two drive lines is operable as an inactive line, and a second drive line of the two drive lines is operable as an active line depending on the direction of rotation in which the electric motor is to be operated; and
- wherein a switching module is associated with the electric motor, the switching module being configured to connect a terminal of the pole housing of the electric motor in each case of direction in which the electric motor is to be operated with the drive line which is operated as the inactive line during operation of the electric motor.

17. A Method of operating an electric motor for actuating a roof component, in a vehicle, comprising:
- controlling the electric motor by means of pulse width modulation via at least two drive lines;
- operating, when the electric motor is controlled, a first drive line of the two drive lines as an inactive line, and a second drive line of the two drive lines as an active line depending on the direction of rotation in which the electric motor is to be operated; and
- connecting, by a switching module, a terminal of a pole housing of the electric motor in each case of direction in which the electric motor is to be operated with the drive line which is operated as the inactive line during operation of the electric motor.

* * * * *